United States Patent
Bells et al.

(10) Patent No.: US 8,494,448 B2
(45) Date of Patent: *Jul. 23, 2013

(54) MOBILE COMMUNICATIONS DEVICE ACCESS FROM PERSONAL COMPUTER

(75) Inventors: Matthew Bells, Waterloo (CA); Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,557

(22) Filed: Apr. 29, 2011

(65) Prior Publication Data

US 2011/0202680 A1 Aug. 18, 2011

Related U.S. Application Data

(63) Continuation of application No. 11/459,039, filed on Jul. 21, 2006, now Pat. No. 7,949,301.

(51) Int. Cl.
*H04B 7/00* (2006.01)

(52) U.S. Cl.
USPC ............ 455/41.2; 455/552.1; 455/553.1; 455/557; 455/420

(58) Field of Classification Search
USPC ............ 455/41.2, 552.1, 553.1, 557, 412.2, 455/414.1, 418–420, 423, 566; 370/245, 370/338, 908; 345/689, 650, 204, 205
See application file for complete search history.

(56) References Cited

U.S. PATENT DOCUMENTS

| | | | |
|---|---|---|---|
| 5,406,643 A | 4/1995 | Burke et al. | |
| 6,252,588 B1 | 6/2001 | Dawson | |
| 6,338,094 B1 * | 1/2002 | Scott et al. | 709/245 |
| 6,421,733 B1 | 7/2002 | Tso et al. | |
| 6,553,446 B1 * | 4/2003 | Miller | 710/307 |
| 6,802,021 B1 * | 10/2004 | Cheng et al. | 714/4.11 |
| 7,047,426 B1 | 5/2006 | Andrews et al. | |
| 7,124,133 B2 * | 10/2006 | Yamauchi et al. | 1/1 |
| 7,287,270 B2 * | 10/2007 | Kai | 726/2 |
| 2002/0010843 A1 * | 1/2002 | Sanada et al. | 711/152 |
| 2002/0065101 A1 | 5/2002 | Picoult et al. | |
| 2003/0025599 A1 | 2/2003 | Monroe | |
| 2004/0038675 A1 | 2/2004 | Criss et al. | |
| 2004/0174853 A1 | 9/2004 | Saito et al. | |
| 2004/0201682 A1 * | 10/2004 | Chauvin et al. | 348/207.1 |
| 2005/0050044 A1 | 3/2005 | Takagi et al. | |
| 2005/0144251 A1 | 6/2005 | Slate | |
| 2005/0202805 A1 | 9/2005 | Chubb et al. | |
| 2005/0208913 A1 | 9/2005 | Raisinghani et al. | |

(Continued)

FOREIGN PATENT DOCUMENTS

| | | |
|---|---|---|
| EP | 1471691 | 10/2004 |
| EP | 1653664 | 5/2006 |
| EP | 1675351 | 6/2006 |

*Primary Examiner* — Dominic E Rego
(74) *Attorney, Agent, or Firm* — Rowand LLP

(57) ABSTRACT

A method is described for providing files to a mobile communications device from an associated personal computer over one of a plurality of potential communication paths between the mobile communications device and the computer. The method includes receiving at the computer a user request that a selected file stored on the computer be provided to the mobile communications device; selecting a communications path from among the plurality of potential communication paths; and causing a copy of the selected file to be provided to the mobile communications device over the selected communication path.

18 Claims, 7 Drawing Sheets

U.S. PATENT DOCUMENTS

| | | |
|---|---|---|
| 2005/0238095 A1 | 10/2005 | Yoshioka et al. |
| 2006/0068777 A1* | 3/2006 | Sadowsky et al. ............ 455/427 |
| 2006/0105749 A1 | 5/2006 | Han et al. |
| 2006/0116138 A1 | 6/2006 | Simsek et al. |
| 2006/0178139 A1 | 8/2006 | Karaoguz et al. |
| 2006/0194541 A1 | 8/2006 | Rekimoto et al. |
| 2007/0004393 A1* | 1/2007 | Forsberg et al. .............. 455/420 |
| 2007/0059955 A1 | 3/2007 | Leno |
| 2007/0094588 A1 | 4/2007 | Klassen et al. |
| 2007/0111756 A1 | 5/2007 | Reed |
| 2008/0005805 A1 | 1/2008 | Kuriya et al. |
| 2012/0239879 A1* | 9/2012 | Kawakami et al. ............ 711/113 |
| 2012/0311256 A1* | 12/2012 | Nakajima et al. ............. 711/114 |

* cited by examiner

MOBILE COMMUNICATIONS DEVICE ACCESS FROM PERSONAL COMPUTER

RELATED APPLICATIONS

This application is a continuation of U.S. patent application Ser. No. 11/459,039 filed Jul. 21, 2006.

FIELD

The present application relates generally to mobile communications device access from a personal computer and, more particularly, to transferring files from a personal computer to the mobile communications device.

BACKGROUND

For various reasons a person may have one or more electronic documents or media files stored on the person's computer that he or she would like to transfer to a mobile communications device. One way in which the person might try to carry out such a transfer would be to e-mail the files to him or herself. Another way in which the person might try to carry out the transfer would be to first upload the files from the person's computer to Internet-accessible storage, and then download the files to the mobile communications device. In addition to these methods requiring over-the-air (OTA) traffic, the methods are also tedious.

Accordingly, it would be advantageous to improve access to a mobile electronic device from a personal computer.

BRIEF DESCRIPTION OF THE DRAWINGS

Reference will now be made, by way of example, to the accompanying drawings which show example embodiments of the present disclosure, and in which.

Similar reference numerals may have been used in different figures to denote similar components.

DESCRIPTION OF EXAMPLE EMBODIMENTS

According to one example embodiment, an automated method for providing files to a mobile communications device from an associated personal computer over one of a plurality of potential communication paths between the mobile communications device and the computer includes receiving at the computer a user request that a selected file stored on the computer be provided to the mobile communications device; selecting a communications path from among the plurality of potential communication paths; and causing a copy of the selected file to be provided to the mobile communications device over the selected communication path.

According to another example embodiment, a system for providing files to a mobile communications device includes a personal computer having: a plurality of interfaces for connecting to a plurality of potential communications paths from the personal computer to a predetermined mobile communications device; a display screen; a user input device; a storage element storing a plurality of files; and a mobile file service module for (i) detecting a file copy request through the user input device requesting that a selected file stored on the storage element be provided to the mobile communications device; (ii) selecting, upon detecting the file copy request, a communications path from among the plurality of potential communication paths; and (iii) causing a copy of the selected file to be provided to the mobile communications device over the selected communication path through one of the interfaces.

The following description of example embodiments of the invention does not limit possible embodiments to any particular computer programming language or system architecture. Embodiments of the present invention are not limited to any particular operating system, mobile communications device architecture, or computer programming language. The term "module" is used herein to refer to represent software, hardware, or combinations thereof.

Figure 1:
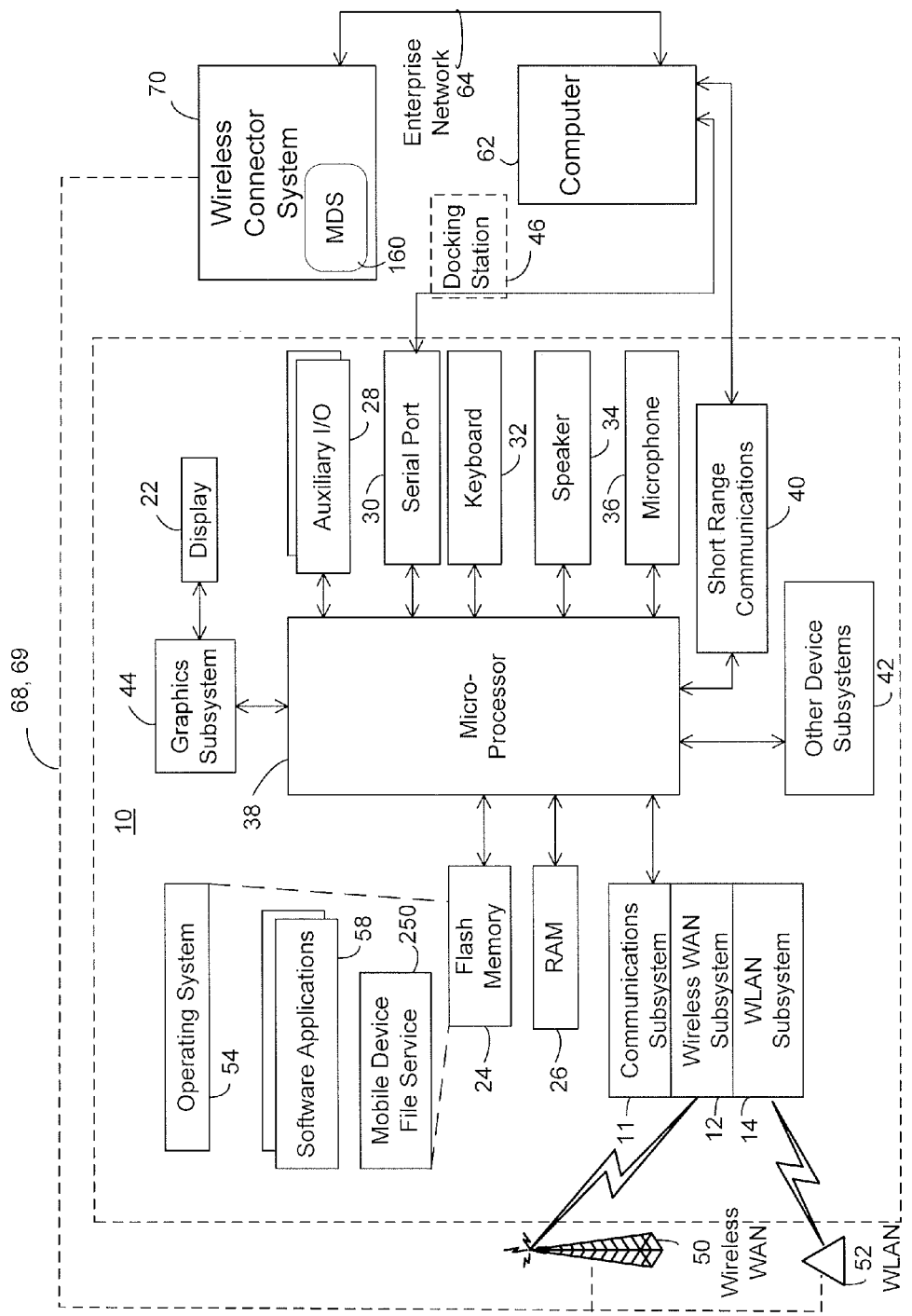
FIG. 1 shows a block diagram of an example architecture of a mobile communications device to which embodiments can be applied.

Referring now to the drawings, FIG. 1 shows a block diagram of an example communications system architecture to which embodiments can be applied. In at least one example, the communications system includes a user device that is a two-way mobile communication device 10 having data and possibly also voice communication capabilities. In an example embodiment, the device 10 has the capability to communicate with other computer systems on the Internet. The device 10 may be a wirelessly enabled handheld device. Depending on the functionality provided by the device 10, in various embodiments the device may be a hand-held data-communication device, a multiple-mode communication device configured for both data and voice communication, a mobile telephone, a PDA enabled for wireless communication, or a computer system with a wireless modem, among other things.

In the illustrated embodiment, the device 10 includes a wireless communication subsystem 11 for exchanging messages with one or more communications networks 50, 52. In one example embodiment, wireless communications subsystem 11 includes a wireless wide area network (WAN) communications subsystem 12 for directly communicating with a cellular wireless wide area network (WAN) 50 and a wireless local area network (WLAN) communications subsystem 14 for directly communicating with a wireless local area network (WLAN) 52. In one embodiment, the communication subsystems 12, 14 may each include a receiver, a transmitter, and associated components such as one or more, preferably embedded or internal, antenna elements and a processing module such as a digital signal processor (DSP). As will be apparent to those skilled in the field of communications, the particular design of the communication subsystem 11 will be dependent in part upon the communication network(s) in which the device 10 is intended to operate.

The device 10 includes a microprocessor 38 that controls the overall operation of the device. The microprocessor 38 interacts with the communications subsystem 11 and also interacts with further device subsystems such as a graphics subsystem 44, flash memory 24, random access memory (RAM) 26, auxiliary input/output (I/O) subsystems 28, serial port 30, keyboard or keypad 32, speaker 34, microphone 36, short-range communications subsystem(s) 40, and any other device subsystems generally designated as 42. The graphics subsystem 44 interacts with the display 22 and renders graphics and/or text upon the display 22.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to the RAM 26.

The microprocessor 38, in addition to its operating system functions, can enable execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless networks 50, 52, an auxiliary I/O subsystem 28, serial port 30, short-range communications subsystem(s) 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

When device 10 is in a data communication mode, a received signal such as a text message or web page download will be processed by the communications subsystem 11 and input to the microprocessor 38, which will preferably further process the received signal for output to the display 22 through the graphics subsystem 44, or alternatively to an auxiliary I/O device 28.

In one embodiment, a user of device 10 may also compose data items within one or more of the software applications 58, such as e-mail messages for example, using the keyboard 32 in conjunction with the display 22 and possibly an auxiliary I/O device 28 such as, for example, a thumbwheel or trackball. Such composed items may then be transmitted over a communication network 50 or 52 through the communication subsystem 11.

The serial port 30 (e.g. a universal serial bus (USB) port in an example embodiment), would normally be implemented in a personal digital assistant (PDA)-type communication device for synchronization with a personal computer 62 (e.g. desktop computer system, laptop computer system, etc.).

Short-range communications subsystem(s) 40 is a further component which may provide for communication between the device 10 and different systems or devices (which need not necessarily be similar devices) and one such system that could be communicated with is the computer 62. For example, the subsystem(s) 40 may include an infrared device and associated circuits and components, and/or a short-range RF communication module/device, such as Bluetooth™ to provide for communication with similarly enabled systems and devices. In an example embodiment, the computer 62 includes a device for translating non-electronic signals received from the subsystem(s) 40 into electronic signals (such as a Bluetooth™ interface for example).

Wireless mobile network 50 is, in an example embodiment, a wireless packet data network which provides radio coverage to mobile communications devices 10. Wireless mobile network 50 may also be a voice and data network such as GSM (Global System for Mobile Communication) and GPRS (General Packet Radio System), CDMA (Code Division Multiple Access), CDMA2000, EDGE (Enhanced Data rates for GSM Evolution), or UMTS (Universal Mobile Telecommunications Systems). In some example embodiments, the network 52 is a WiFi or wireless local area network (WLAN) having a number of wireless access points and operating, for example, in conformance with one or more IEEE 802.11 protocols. Thus, in at least some example embodiments, the device 10 is configured to communicate over both wireless wide area networks and wireless local area networks.

In at least some example embodiments, the computer 62 (along with a number of other similar computer systems) are part of and/or connected to an enterprise network 64 that may include one or more wired and wireless Local Area Networks and combinations thereof. The networks that make up enterprise network 64 may be interconnected by dedicated or shared communications links. Typically, the enterprise network 64 will be protected by at least one enterprise-maintained firewall. In at least some example embodiments, included in and/or connected to the enterprise network 64 is at least one wireless connector system 70, which may be implemented by an appropriately configured server or server cluster, that facilitates communications between the computer systems and servers associated with the enterprise network 64 and the wireless WAN network 50 and the WLAN network 52. The wireless connector system 70 communicates with wireless WAN 50 and WLAN network 52 over respective communications links 68, 69, which may include gateways, the Internet, and other shared or dedicated links. In some embodiments, the WLAN network 52 is part of the enterprise network 64.

Referring again to the software applications 58, these may also include one or more applications enabling reviewing, perceiving, management and/or editing of electronic document files or media files through the appropriate output and/or input components of the device 10. Examples of applications that might include this functionality include word processing/document viewing applications, media/image viewers, messaging applications, media players, editor applications, etc.

Figure 2:
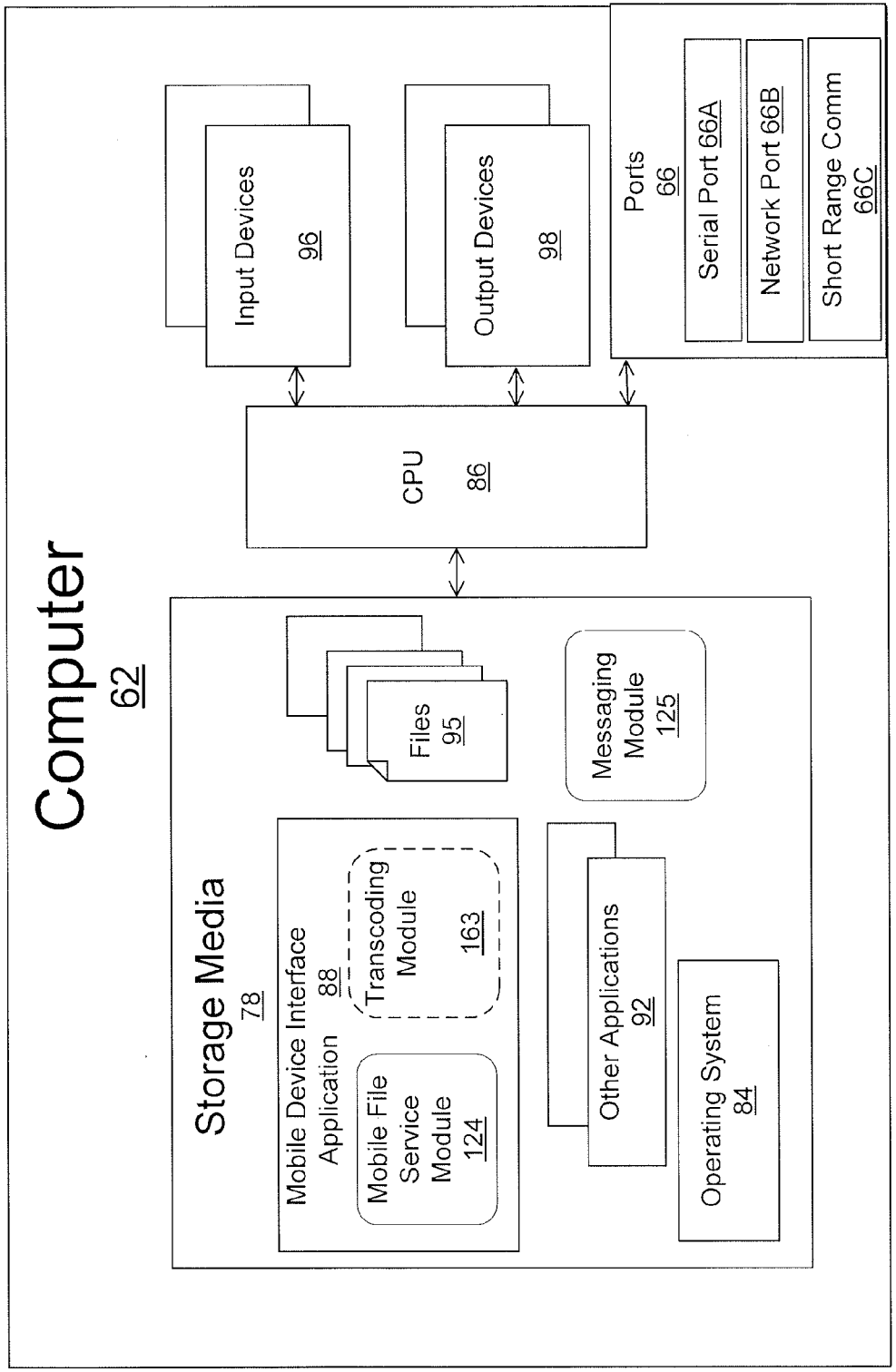
FIG. 2 shows a block diagram of an example computer system within which a mobile communications device file service can be implemented in accordance with a number of example embodiments.

Referring now to FIG. 2, the personal computer 62 includes one or more storage media 78 in communication with a central processing unit (CPU) 86. Although the storage media 78 will commonly be one or more hard-disk drives, the storage media 78 could additionally or alternatively include DVD-type media, CD-type media, flash memory, jump drives, diskettes, RAM and/or other types of media. In some embodiments, various types of software are stored on the media (or medium) 78 including an operating system 84, a mobile communications device interface application 88 and other applications 92. Also stored on the media 78 are many identifiable files 95.

The computer 62 further includes one or more input devices 96, output devices 98, and communications subsystems or ports 66 in communication with CPU 86. Examples of possible input devices include a mouse, keyboard, scanner, microphone, etc. Many or all of these input devices might not be within the main housing of the computer, but might instead provide input through one of the externally exposed ports 66. Examples of possible output devices include a monitor, printer, speakers, etc. Many or all of these devices might be located outside of the main computer housing, and, as such, output signals from the CPU 86 to one of the devices 98 might be transmitted through one of the ports 66. As will be appreciated by those skilled in the art, it is also possible that one or more of the devices 96 and 98 could be a device that might more accurately be described as both an input and output device. Ports 66, in an example embodiment, include a serial port 66A, such as a USB port, for supporting a wired connection to the USB port 30 of the mobile communications device 10 either directly or through a docking station 46 (FIG. 1). Ports 66 also include, in an example embodiment, a network port 66B for connecting the computer 62 to network 64. The port 66B may include, for example an Ethernet 10/100 connector and/or a WLAN communications sub-system. A short-range wireless communications port 66C is included in an example embodiment for supporting direct wireless communications such as Bluetooth™ or infrared with the mobile communications device 10.

As indicated above, among the software applications on the computer 62 is a mobile communications device interface application 88 (or suite of applications) which in an example embodiment includes computer instructions that are executable by the CPU 86 of the computer 62 to implement, among other things, a mobile file service module 124 that facilitates, as described in greater detail below, the transfer of files from the computer 62 to a mobile communications device 10 that is associated with (for example, has a common user as) the computer 62. By way of example, the computer 62 and a mobile communications device 10 may be associated through a common user who has an assigned domain login ID and email account within a network. The communications device can be associated with the user domain ID and email account during activation. When a user logs onto a particular computer 62 using the domain login ID, both the computer 62 and mobile communications device 10 are commonly associated with the user and hence each other. Association of the communications device with the computer 62 could also occur through other means, for example, when a user originally activates the mobile device, the device and the computer may exchange IDs and or addresses by being plugged directly together through a USB connection for example. In another example, the device may, upon activation, search for other devices through a short-range communications system such as Bluetooth™, and the user presented with a list of device to "pair" with; the communications device and the selected device then authenticate each other via a password exchange, and, once paired, the associated devices remember the pairing and password so that future linking between the device is automatically performed.

Figure 3:
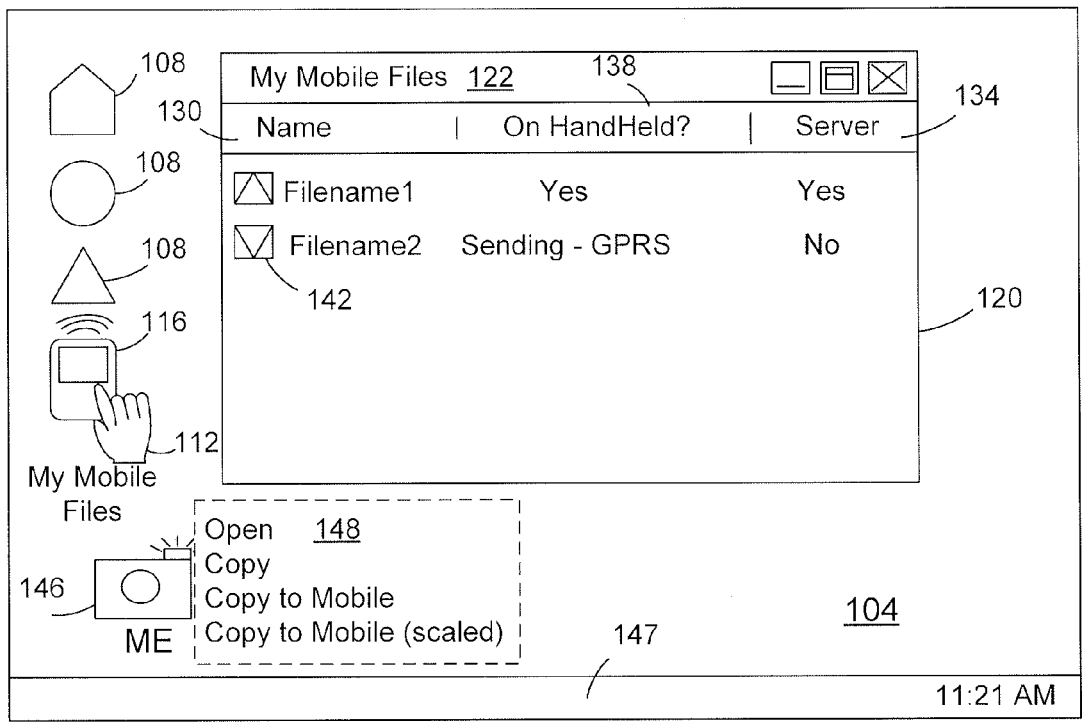
FIG. 3 shows, in diagrammatic form, an example desktop screen of the computer system of FIG. 2.

FIG. 3 shows an example desktop user interface 104 generated on a display screen of computer 62 by the operating system 84. On the desktop interface 104 are a plurality of icons 108, any one of which can be selected by a user who moves cursor 112 to the desired icon on the desktop interface 104. In an example embodiment, included among the icons is an icon 116, labeled for example "My Mobile Files", that links to a shell extension or folder associated with the mobile file service module 124. Referring to FIGS. 2 and 3, selecting the icon 116 results in a generation of a user interface window 120 for assisting a user in transferring files to the user's mobile communications device 10. The window 120 of the "My Mobile Files" folder 122 represents the status of files that have been selected for transfer from the computer 62 to its associated mobile communications device 10.

In an example embodiment, a user that desires to transfer a file to his or her mobile communications device need only "drag and drop" or "copy and paste" the file into the mobile files folder 122. For example, icon 146 (which links to a JPEG image file named "ME") could be dragged and dropped into the window 120 or cut/copied and then pasted into the window 120. These user actions (drag and dropping/pasting) are recognized by the mobile file server module 124 as a request to copy the file associated with icon 146 to the user's mobile communications device 10.

In some example embodiments, a file copying request could be made by dragging and dropping the icon associated with the file onto an icon associated with the mobile communications device file service module 124. Using the illustrated screen interfaces 104, 120 as an example, the file named "ME" could be copied to the mobile communications device 10 by, for example, dragging and dropping the icon 146 onto the icon 116. It will be understood that the "My Mobile Files" icon 116 could alternatively or additionally be located on a tool bar 147 of the desktop interface 104, so for example, the icon 146 might be dragged and dropped onto an icon 116 on the tool bar in order to make the same file-copying request. Also, there could (in some example embodiments) be a right-click selection option for copying a file to the mobile communications device. Using the illustrated screen shot as an example, the user could bring the cursor 112 over the icon 146, and then right-click using his or her mouse. One of the selections then presented in a drop-down menu 148 to the user (for example, through a revealed selections list) could then be, "Copy to mobile communications device". Thus, in example embodiments, the user of computer 62 can push a file from the computer 62 to a predetermined mobile communications device with little effort, without requiring the user to open an email messaging application and send the file as an attachment.

Figure 5:
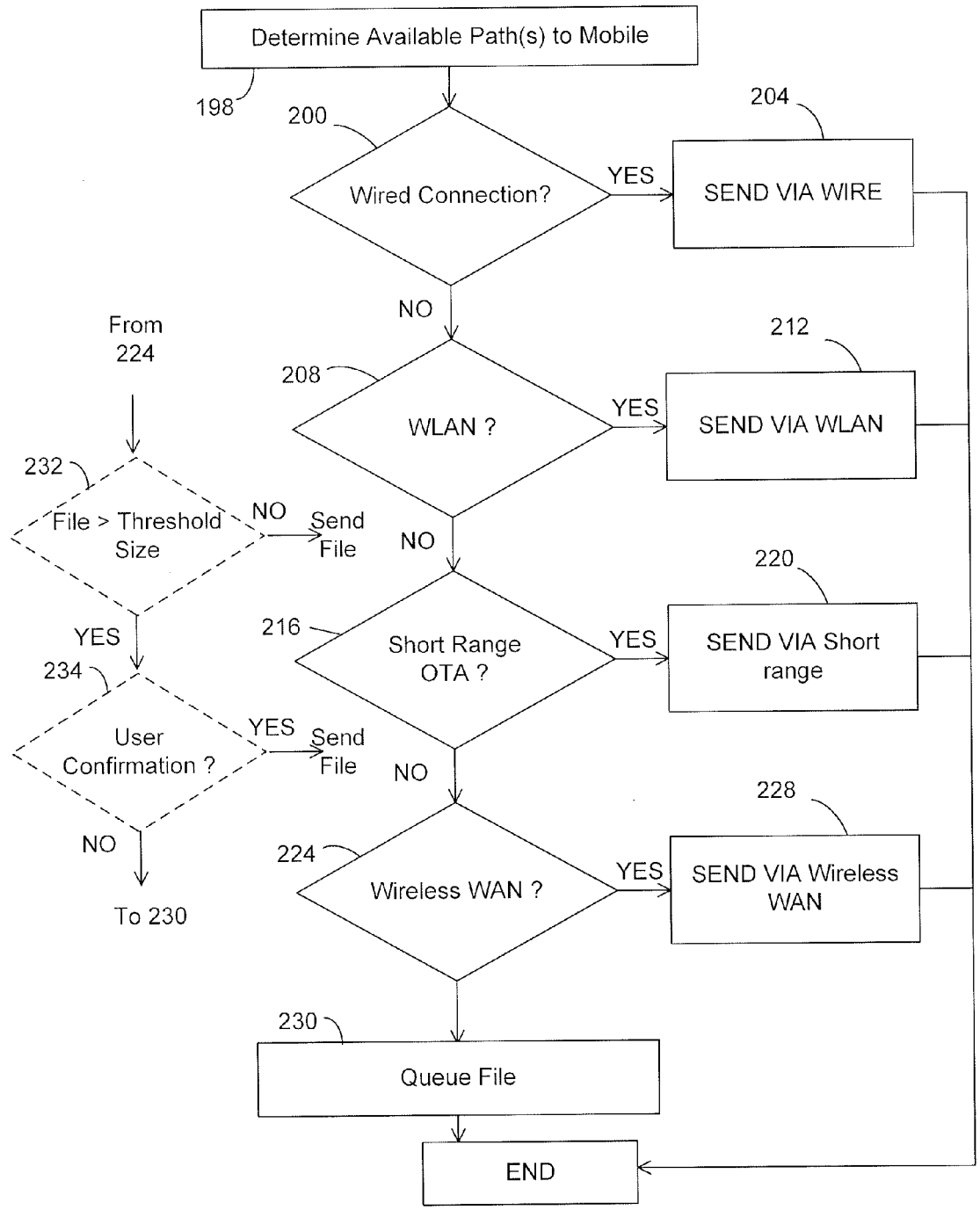
FIG. 5 shows, in flowchart form, an example embodiment of a transmission management method.

Once a file-copy request occurs (for example, a file has been added by a user to the "My Mobile Files" folder 122) the mobile file server module 124 automatically begins a file transfer process, illustrated in FIG. 5, for copying the file (in this example, JPEG image file 146) to the user's mobile communications device 10. In the illustrated embodiment, a number of different possible communications paths exist for transferring the file from the personal computer 62 to the mobile communications device 10, including (a) through a direct connection via the USB port 30 of the device 10 if it is docked or otherwise connected by wire to the computer system 10, (b) through WLAN network 52 if the device 10 is active within such network, (c) through short-range wireless communications such as Bluetooth™ or using infrared, or (d) through Wireless WAN network 50 if the device 10 is active within such network. According to example embodiments, the mobile file service module 124 automatically selects, based on predetermined criteria, a suitable communications path for transferring the file to the mobile communications device 10. As will be explained in greater detail below, the predetermined criteria may be based on, among other things, the current available communication path(s) between the computer 62 and the mobile communications device 10 and the characteristics, such as file size, of the file being transferred.

The file transfer process of FIG. 5 includes a step 198 of determining the current communications path(s) available between the personal computer 62 and the mobile communications device 10. In this regard, the computer 62 will typically be aware of whether a direct communications link, either through a wired link through USB ports 66A and 30, or through a short-range wireless communications port 66C (for example a Bluetooth™ or an infrared connection), with the mobile communications device 10 is currently active. With respect to non-direct communication paths such as through Wireless WAN network 50 and WLAN network 52, the computer 62 in an example embodiment receives communications from the wireless connector system 70, generated either automatically or in response to a polling request, indicating whether a current Wireless WAN or WLAN path to the mobile communications device 10 is active. In some embodiments, the computer 62 may just assume that a Wireless WAN path is available, and rely on the wireless connector system 70 and/or other systems in the Wireless WAN path to deliver a transferred file over such path, if it is selected, when the Wireless WAN path becomes available even if it is not immediately available.

Once the available communication paths have been determined, an appropriate path for providing the target file to the mobile communications device 10 is selected based. In one example the paths are ranked according to bandwidth and/or cost. For example, in the presently described example, a wired link between the USB ports of the computer 62 and the mobile communications device 10, either directly, or through docking station 46, offers the largest bandwidth with no usage cost for transferring a file. Thus, as indicated at steps 200 and 202, if a wired communications path is currently available, it is the first choice for providing the target file to the mobile communications device 10. As indicated in steps 208 and 212, if a wired path is not available, the second choice, if currently available, is to use a path through a WiFi network such as WLAN 52 as WLAN's typically offer high bandwidth at no or low data transfer cost. If neither a wired or WLAN path is available, then as indicated in steps 216 and 220, the third choice, if currently available, is a direct, short-range, over-the-air communications path, such as a Bluetooth™ link between the computer 62 and mobile communications device 10. Such links tend to be low bandwidth, but have no usage fee. Finally, the fourth ranked option is to send the file over a communications path that includes wireless WAN 50, which, as indicated above, may be a GPRS network among other things, which has relatively low bandwidth and may have usage charges. It will be appreciated that fewer or more alternative communications paths could be included in the selection process of FIG. 5 in various embodiments, and that the relative preferences rankings for the paths could be in a different order than shown in FIG. 5.

As indicated in step 230, in embodiments where no acceptable communications path is available, the mobile file service module 124, in at least one example embodiment, stores the file transfer request in a queue for later processing when a communications path to the device 10 is available.

In one example embodiment, characteristics of the target file are used in combination with the path priority rankings and/or user input for determining the appropriate communications paths. For example, as indicated in FIG. 5, checking steps 232 and 234 can performed prior to sending the file over selected paths, including low-bandwidth and/or toll-incurring communications paths such as short-range Bluetooth path or a Wireless WAN path. For example, in the illustrated embodiment, if the only available data path is the wireless WAN path then, prior to sending data over the wireless WAN, between steps 224 and 228, a check is made in step 232 to determine if the size of the target file to be sent exceeds a predetermined threshold. If the file size is below the threshold, it is sent over the selected path. However, as indicated in step 234, if the file size exceeds the threshold, then confirmation is sought from the user of computer 62, through an interface such as a dialog box, that the user does indeed want to use the selected communications path to send the file. If the user confirms that he or she wants to use the selected path, the file is sent accordingly. Otherwise, the next ranked communications path is used or checked for suitability, or the file request is queued, as per step 230, until an acceptable communications path becomes available (for example, until the mobile communications device 10 is docked, or enters coverage area of WLAN 52).

In various example embodiments, checking steps 232 and 234 can be performed prior to using any of the communications paths, and the size threshold can be uniquely pre-configured for each communications path—for example, the threshold file size for requiring user conformation for a WLAN path may be larger than that for the Wireless WAN path. In some example embodiments, a communications path may be rejected based on file size alone without requesting user input.

Figure 4:
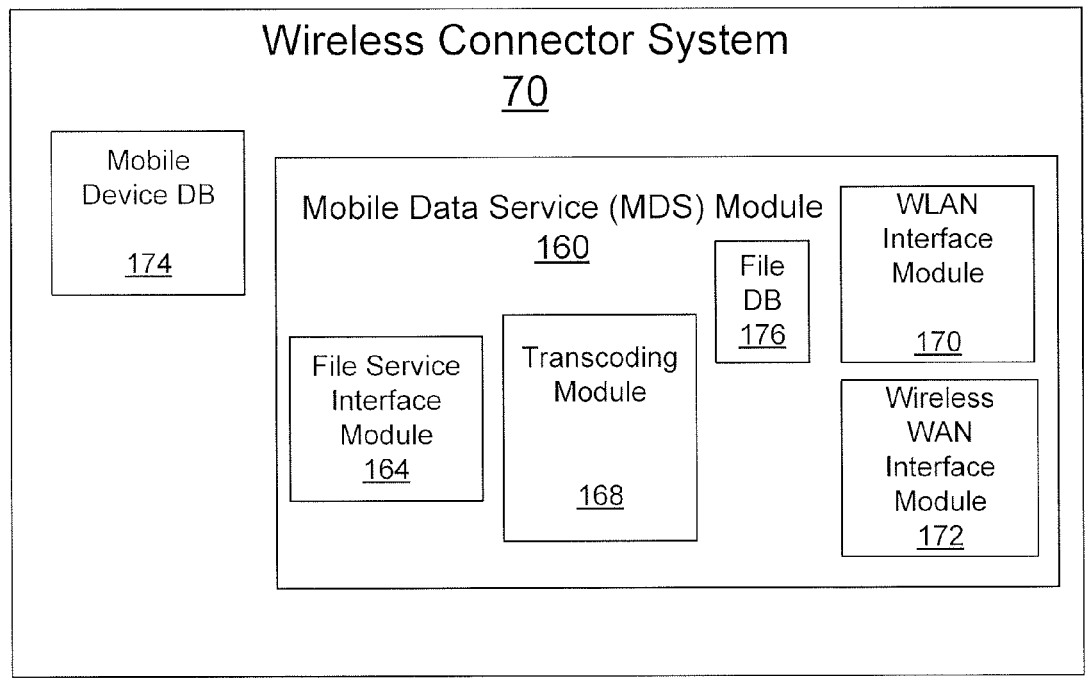
FIG. 4 shows a block diagram of an example network server within which a mobile data service for mobile communications devices can be run in accordance with a number of example embodiments.

In the presently described example embodiment, file transfer using either a wired connection, such as in step 204, or a short-range OTA path, such as in step 220, are performed directly between the computer 62 and the mobile communications device 10. In such cases, a file transfer session is set up directly between the computer 62 and the mobile communications device 10 and the target file is sent to the device during such session. File transfer over either WLAN 52 or wireless WAN 50 are, in some example embodiments, routed through the wireless connector system 70. Referring to FIG. 4, the wireless connector system 70 includes a mobile data service (MDS) module 160 for pushing data from devices such as computer 62 within the enterprise network 64 out over wireless WAN 50 or WLAN 52 to associated mobile communications devices 10. MDS module 160 includes a file service interface module 164 for handling file delivery requests made through the mobile file service module 124 of the computer 62 (and other computers within network 64). In steps 212 and 228 of the file delivery process of FIG. 5, the mobile file service module 214 of the computer 62 causes the target file to be sent to the Wireless Connector System 70 together with a request to deliver the target file to a selected mobile communications device 10 over WLAN 52 or Wireless WAN 50. The request is processed at the wireless connector system 70 by the file service interface module 164 of MDS module 160. MDS module 160, which, in an example embodiment, includes a WLAN interface module 170 for communicating with mobile communications devices 10 within WLAN 52 and a Wireless WAN interface module 172 for communicating with mobile communications devices within wireless WAN 50, establishes a file transfer session over the appropriate network and transmits the target file to the selected mobile communications device 10. The file service interface module 164 advises the mobile file service module 124 of the success or failure of the file transfer process.

Turning again to FIG. 3, in the illustrated embodiment, the interface window 120 generated on the screen of computer 62 lists information in relation to the files that have been selected for transfer to the mobile communications device 10. For example, a column 130 within the window 120 lists names of files selected for copying. A status column 138 indicates the transfer status of a selected file—for example, with reference to the file "filename1", the "yes" entry in column 138 indicates that the file has been successfully transferred to the mobile communications device 10. A status such as "no" or "pending" may be used to identify a file that has been queued pending the establishment of an acceptable communications path. The status "Sending" may indicate that a file is in the process of being copied to the mobile communications device 10, and the path being used for the transmission may also be specified. Also, it will be understood that there could be additional columns within the window 120 providing additional information, such as file location, file size, file creation date, file type (an icon 142 adjacent each of the file names may provide type information).

In at least some example embodiments of the invention, prior to copying a file to the mobile communications device 10, a determination is made if the target file should be transcoded prior to being provided to the mobile communications device 10. Transcoding involves altering the target file to adapt it for the mobile communications device. In one configuration, when a target file for copying is selected by a user of computer 62 for copying to a target mobile communications device 10, the mobile file service module 124 provides the file (or information about the file, such as file type and size), via enterprise network 64 and file service interface module 164, to the MDS module 160 of the wireless connector system. The MDS module 160 includes a transcoding module 168, which determines if transcoding of the target file is required, and if so, then performs the necessary transcoding.

In some example embodiments, transcoding may be performed based on characteristics of the target file (such as file size, file type, file color space, and gamma characteristics). In at least some example embodiments, the target files are also transcoded based on known characteristics of the target mobile communications device 10. For example, the MDS module 160 may maintain, or have access to, a database 174 of information about the mobile communications devices 10 that are serviced by it. Such database 174 may specify for each mobile communications device 10 details such as screen size and pixel density, supported color space, supported image file-types, amount of memory, and screen color responsiveness characteristics (for example gamma). In some embodiments, characteristics of the target mobile communications device 10 are assumed—for example, low memory capacity is assumed, rather than specifically known. In some embodiments, the characteristics of the selected communications path may be taken into account when making transcoding decisions.

Thus, in an example embodiment, the transcoding module 168 determines, based on the target file characteristics and target device characteristics, if transcoding is desired, and if so, transcodes the file. For example, transcoding of an image file may include determining if the image file is of a format type supported by the target mobile communications device, and if not, the image is converted from one format to a format supported by the device. Transcoding of an image file could include determining if the image exceeded a certain size, and if so, adapting the file to reduce the size of the image file. This could be done by converting the format of the image (e.g. from .bmp to .jpg), by reducing the resolution of the image (by merging or dropping pixels for example), reducing the color space, or a combination of one or more of these. In some embodiments, the gamma characteristics of an image file could be adapted during transcoding to increase vibrancy on the mobile communications device.

Once the file is transcoded, in the event that the selected communications path is a direct link from the personal computer 62 (for example, through a docking connection or Bluetooth™-type connection) the transcoded file can be sent from the mobile data service 160 back to the computer 62 for delivery by the computer 62 over the direct link. In the event that the selected communications path is through Wireless WAN 50 or WLAN 52, the transcoded file can be routed to target mobile communications device 10 through one of Wireless WAN interface module 172 or WLAN interface module 170 as appropriate.

It will be understood however that other types of transcoding and transcoding of other types of files besides image files, such as audio and video files, is possible. For example, information can be removed from the files to make them smaller. Possible transcoding operations on audio files include, among other things, converting the file from stereophonic to monophonic, and reducing the encoded information through high- and low-pass filtering to what the receiving device is capable of reproducing (e.g. removing low-frequency and high-frequency sound information that is outside of the frequency ranges the receiving device can reproduce). Possible transcoding operations on video files include, among other things, producing a file with fewer frames and a lower frame rate (hence having less information). Thus, one or more sets of criteria for establishing whether a particular file should be transcoded could be met by other types of files besides image files. In some example embodiments (particularly those in which the device 10 is intended for voice communications) certain types of music files (e.g. MIDI files) will be transcoded to a ringtone during the process of file copying from the computer 62 to the device 10. An effect of this might be removing the need for a music transcoding module within any ringtone processing applications on the device. In the case of a ringtone, transcoding may include truncating an audio file at a predetermined duration, for example 15 or 20 seconds. Thus, among other things, transcoding can include one or more of the operations of resizing, lossy compression, high- and/or low-pass filtering, color-space transformation, interlacing animation, or removing unnecessary scripts or markup.

The process of file transcoding will not always be carried out at the server. Referring to FIG. 2, the mobile communications device interface application 88 will (in some example embodiments) include a transcoding module 163 for transcoding files in a manner similar to that described above. As yet another possibility, there could be combined interaction between, for example, modules at both the wireless connectors system 70 and the computer 62 to carry out file transcoding. Furthermore, all or part of the functionality of the transcoding module could be located at servers other than those used to implement the wireless connector system 70. For instance, libraries on a server (not necessarily the wireless connector system 160) could be linked to code on the computer 62. In this manner, the file could be sent out with parameters, so that a transcoded file could be subsequently returned.

Rather than having the decision as to whether a file should be transcoded automatically made, in some example embodiments the user can control whether or not the file is transcoded. Referring to FIG. 3 for the purpose of illustrating an example, a user might right-click on the icon 146, following which a list of selections 148 could be presented to him or her. One of the selections might be "Copy to mobile communications device", and another of the selections might be "Copy to mobile communications device (scaled)". Optionally, if a selected file is categorized as being a candidate for transcoding, prior to performing the transcoding the user of computer 62 is prompted through a dialogue window to confirm whether the user wants a transcoded file or the untranscoded file sent to the mobile communications device 10. If the user selects "untranscoded", then the transcoding step is bypassed. For example, the user may be given an option to transcode if it is determined that a file exceeds a certain size. The user may decide not to transcode. In an example where the device is undocked an the communications path will be a low bandwidth path, the user may then be prompted (as part of the process of FIG. 5) to confirm whether he or she wants to send the large untrascoded file now or to queue the transfer request for later when a faster path is available (such as when docked or in WLAN range).

In at least one example embodiment, in certain circumstances when a file is transcoded, a copy of the original, untranscoded file is stored within the enterprise network 64 and the transcoded file includes information for identifying the untranscoded copy in order to enable the mobile communications device 10 to, at some time in the future, access the untranscoded file. For example, in one configuration, when an image file is transcoded to reduce its resolution in order to reduce its file size, the transcoding module 168 stores a copy of the untranscoded image file in an untranscoded file database 176 at the wireless connector system 70. Linking or other identifying information about the untranscoded file is embedded into the lower-resolution, transcoded file image, which is then provided to the mobile communications device 10. At a later time, for example, when the transcoded image file is being viewed at the mobile communications device 10, the mobile communications device 10 can request that additional information be provided from the untranscoded file stored back at the wireless connector system 70, as will be explained in greater detail below (for example, when zooming in on an image file). In some embodiments, the untranscoded files are stored at a location other than at wireless connector system 70, for example at another server either inside or outside of the enterprise network, or at the originating computer 62 itself.

In some embodiments, transcoding may involve sending only an extract or part of the content of a larger file, with the ability to retrieve other parts of the file from the mobile communications device as required. For example, a portion of a large text file may be extracted and sent as the transcoded file, with the large text file being stored as the untranscoded file at the wireless connector system 70. Additional extracts from the large file can then be requested in the future from the mobile communications device 10. Similarly extracts of audio and/or video files can be provided through transcoding, with the full files being stored back on the enterprise side of the network for future access.

In some embodiments, when a transcoded file has been provided to the mobile communications device 10 and an untranscoded copy of the file is accessible to the mobile communications device 10, an indication of the availability of the untranscoded file is included in interface window 120 on computer 62 (see FIG. 3)—for example a column 134 can be provided indicating that an untranscoded version of the file is available on the server (wireless connector system 70).

Turning now to mobile communications device 10, in example configurations, the files provided to the mobile communications device 10 from the computer 62 using the mobile file service module 124 are "pushed" to the device 10 in the sense that user interaction at the device 10 is not required for the device 10 to receive and store a sent file. In at least one example embodiment, a password entry is required at the computer 62 to copy files to the "My Mobile Files" folder in order to mitigate against unwanted files being pushed to the device 10. In order to process incoming files, with reference to FIG. 1, among the software applications stored on mobile communications device 10 is a mobile communications device file service application 250. In certain example embodiments, the processor 38, at least in part under instructions from the file service component 250, is configured to implement a file service module 300, represented in FIG. 6, for interacting with various device subsystems to handle incoming files originating from the computer 62. Some or part of the functionality of the file service module 300 can be implemented through firmware or hardware components instead of, or in combination with, computer software instructions executed by the microprocessor 38 (or other processors).

Figure 6:
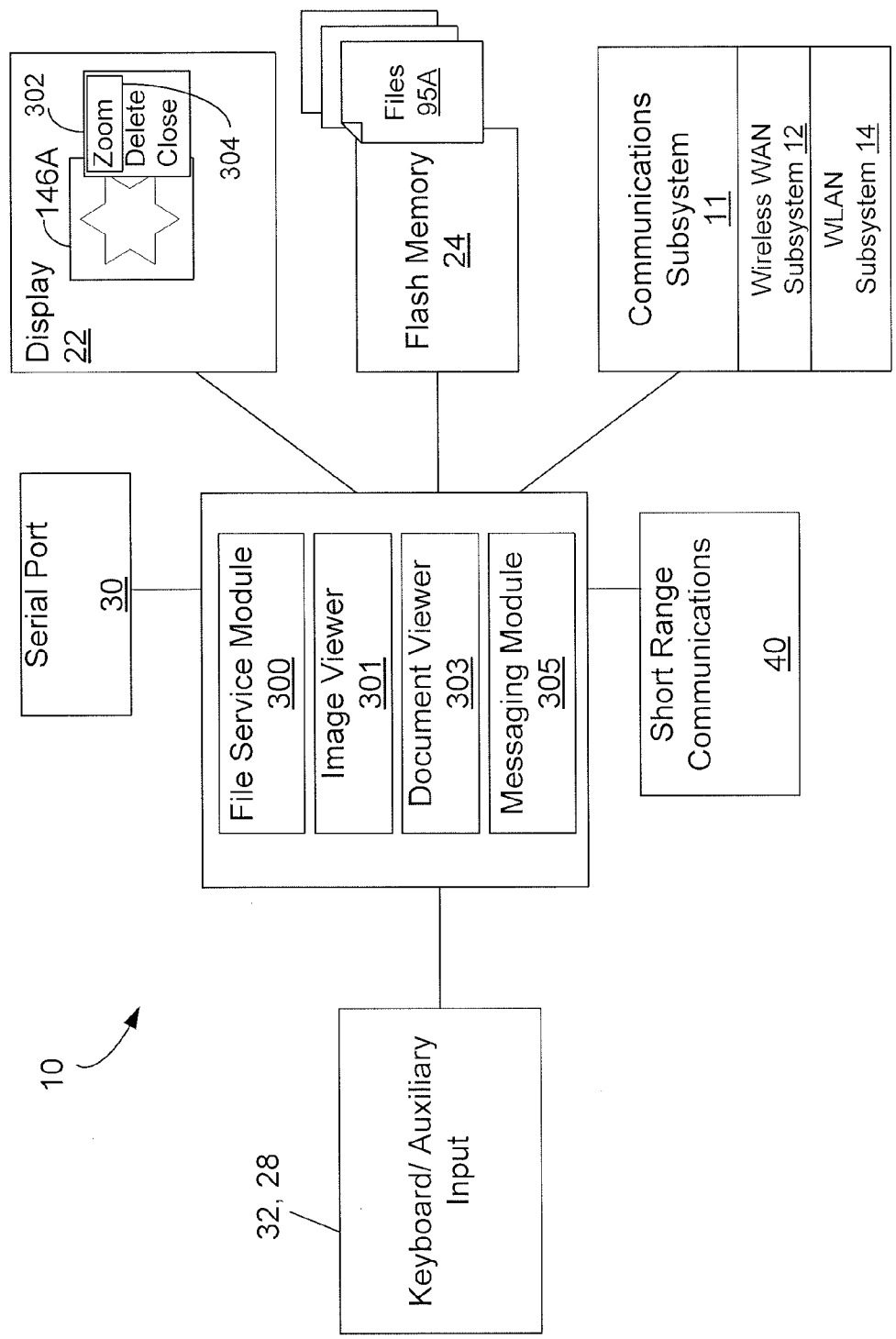
FIG. 6 shows a further block diagram representation of the mobile communications device shown FIG. 1.

With reference to FIG. 6, in the presently described embodiment, a file 95 can be pushed from the computer 62 to the mobile communications device 10 through any one of serial (USB) port 30, short-range communications subsystem (for example Bluetooth™ or IR) 40, Wireless WAN subsystem 12, and WLAN subsystem 14. In an example embodiment, files pushed to the device by the mobile file service module 124 of computer 62 will include information that identifies files to be managed by the file service module 300 on device 10. Thus, when such a file is received at the device 10 over any of the possible communications paths, the mobile communications device recognizes that handling of the received file 95A at the device 10 is to be managed by the file service module 300. As indicated previously, in an example embodiment, the file service module 300 facilitates automatic storage of the received file 95A in a storage element of the device 10 such as flash memory 24 such that the receipt and storage of the pushed files requires no user interaction with the mobile communications device 10. The files 95A may be stored in folders according to type (for example, image files stored in a "pictures" folder, audio files in an "audio" file, text files in a "text" folder, application files in an "application" folder etc.). In some embodiments, the Folders are preconfigured by a user of the device 10 or a system administrator. Once stored, the files 95A can be accessed by a user using an appropriate access application—for example, an image viewer application, audio file player, text file/document viewer application, etc.

As indicated above, in some embodiments, an untranscoded version of the file 95 is maintained within the enterprise network 64 (for example on wireless connectors system 70 or computer 62) in synchronization with the transcoded file 95A that is provided to the mobile communications device 10, thus allowing the device 10 to request that additional information from the untranscoded file be delivered over one of the communications paths to the mobile communications device 10. For example, referring to FIG. 6, the transcoded image file 146A is being displayed by an image viewer module 301 of the mobile communications device 10 on the display of the device. Through an input device 28, the user can call up a dialog box 302 that displays selectable options, including a "zoom" option 304. If the zoom option 304 is selected, a selected portion of the image 146 is enlarged on the display 22 by the image viewer. In order to maintain the quality of the zoomed image, higher resolution is required than is available from the transcoded image 146A. Thus, the image viewer 301 passes a request to the file service module 300 for more data from the synchronized untranscoded file. The file service module 300 goes through a process similar to that shown in FIG. 5 of determining the best available communications path between the mobile communications device 10 and the location of the untranscoded file, then sends a request for additional information from the untranscoded file over the selected communications path, and receives the additional information over the selected communications path, thereby allowing the image quality to bemaintained during the zoom-in process. Such a feature could be used to enhance the quality of an unzoomed image as well.

In some embodiments, the transcoded file may be a document file being displayed by a document viewer (such as a word processor), where only a part or extract of the original file is downloaded to the device 10 and the user is advised that "more is available . . . ". When the user requests more, the device 10 requests that additional information from the untranscoded file be provided to the device 10.

In some example embodiments, when a request for more information or data from the untranscoded file is initiated at the device 10, the device 10 will typically be in an undocked state, with available communications paths being limited to WLAN 52 and/or wireless WAN 50, in which case the MDS module 160 manages the request for and delivery of further information from the synchronized untranscoded file that is stored in database 176 back on the enterprise network 64. In some alternative embodiments, all or some of the request and file-delivery management functions could be performed at the computer 62 or by a further element within the network 64.

In some embodiments, the transcoded files 95A delivered to the mobile communications device 10 are substantially limited to a file name and information identifying the related untranscoded file. Thus, in such embodiments, only very limited information from the files would be copied to the persistent storage medium of the mobile communications device 10. The file content would substantially reside on the enterprise network side (such as at database wireless connector system 70) for access by the wirelessly enabled device as needed.

Figure 7:
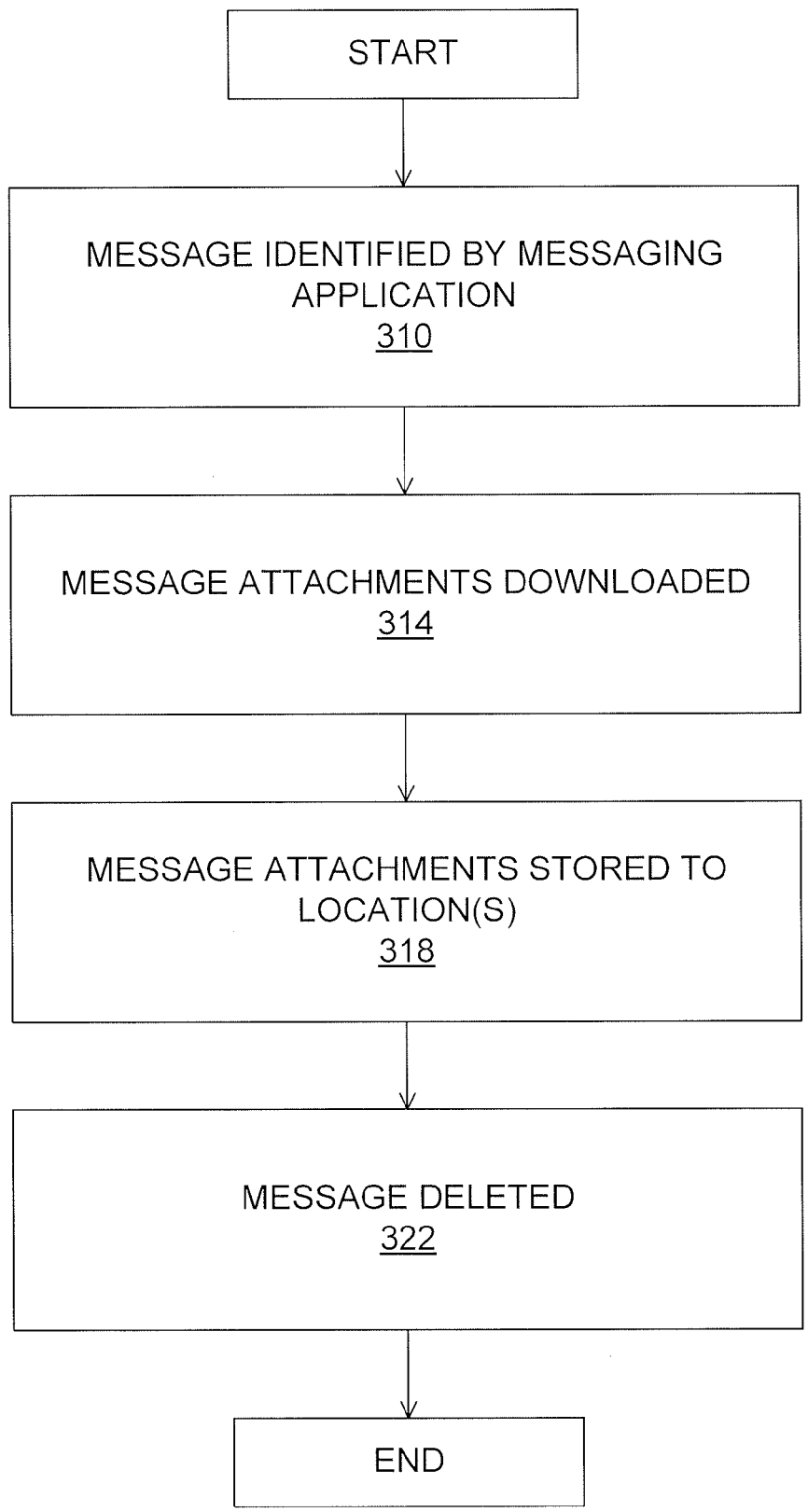
FIG. 7 shows, in flowchart form, an example embodiment of a file copying method.

In various situations, the computer 62 may not be located in an enterprise network that has a wireless connector system 70, and thus at least some of the functions described above as being carried out at the wireless connector system 70 will be carried out at the computer 62. Furthermore, in some embodiments where a mobile connector system is not present, the computer 62 may not have access to a mobile data service module and may be limited to using email messaging as the delivery vehicle for files transmitted over wireless WAN 50, and computer 62 includes among software applications 92 an email client application for implementing a messaging module 125 for sending and receiving email. In an email-implemented embodiment, when the user of computer 62 selects a file for copying, and the wireless WAN 50 is selected as the communications path, then the mobile file service module 124 works with the messaging module 125 to automatically generate an email message having the target file as an attachment. The email is then sent to the mobile communications device; in at least one embodiment, the email is actually sent to an email address associated with the computer 62 itself, and a copy of the email is redirected by a redirector system to the mobile communications device 10. A messaging application is resident on device 10 for implementing a mobile messaging module 305 for managing incoming and outgoing email. FIG. 7 illustrates an example process for handling incoming email messages with file attachments sent by the mobile file service module 124 of computer 62.

In first step 310 of the file-copying method illustrated in FIG. 7, the messaging module 305 of the device 10 identifies a particular received message as having been sent for the purpose of copying one or more files onto the device 10. It will be understood that there could be various ways in which a received message could be identified. For example, a particular character or phrase used in the subject line could identify the message. Alternatively, MIME code, characters within the message text, etc. could identify the message.

After the received message has been identified at step 310 (and assuming downloading has not already occurred), any message attachments are downloaded at step 314. The message attachments are the files, and at step 318 these files are stored in specified or default location(s) on a storage medium of the device. Just as a message could include code (or pseudo-code) for the purpose of identification at the step 310, so too can a message include code for specifying copying location(s) on the device. Once the file(s) have been copied to the device, the received message has fulfilled its purpose. Thus, the message is deleted from the device at the step 322. Accordingly, no user interaction is required at the device 10 for the device 10 to receive and store the file.

Figure 8:
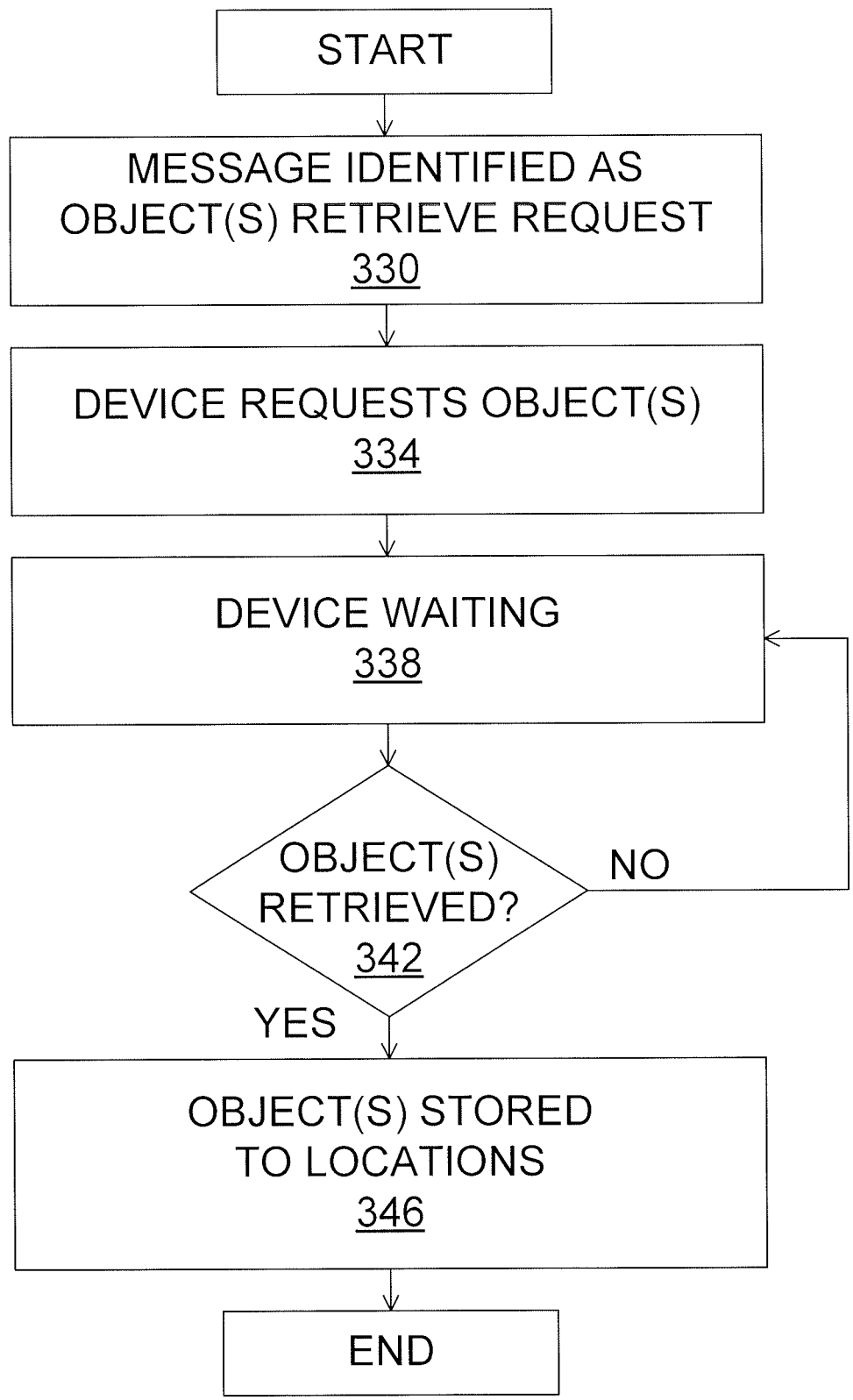
FIG. 8 shows, in flowchart form, an alternative example embodiment of a file copying method.

A file-copying method in accordance with an alternative example embodiment over wireless WAN path 50 is illustrated in FIG. 8. The illustrated method could be implemented partly by messaging module 305, and partly by the remote file service module 300 in conjunction with one or more file transmission-side components within the computer 62 and/or the wireless connector system 70. In the method of FIG. 8, instead of immediately sending the file to the mobile communications device 10, the computer 62 (or in some embodiments, the wireless connector system 70) is configured to send a request to the mobile communications device 10 to retrieve the target file from a specified or predetermined location (which may, for example, be at a server accessible to the Mobile communications device) where a copy of the selected file has been stored by the computer 62 and/or the wireless connector system 70. At the mobile communications device, in first step 330 of the file-copying method illustrated in FIG. 8, the messaging application of the device 10 identifies a particular received message as having been sent for the purpose of requesting that one or more files be copied to the device. In certain instances, the received message will be a short message service (SMS) message. In other instances, the received message will be an email or other type of message. Again, it will be understood that there could be various ways in which a received message could be identified. For example, a particular character or phrase used in the subject line could identify the message. Alternatively, MIME code, characters within the message text, etc. could identify the message. Transfers may occur using HTTP, FTP, or other protocols capable of carrying meta information (filename, attributes) as well as the data.

After the received message has been identified as a file(s)-retrieve (copy) request at the step 330, the device requests (from wherever the file(s) are located) transmission of the file(s) at step 334. After this step, the device waits for the file(s) to be transmitted at step 338, until it is determined at step 342 that the file(s) have been entirely transmitted.

Once the file or files have been retrieved, they are stored in the desired location(s) at step 346. Also, in some examples, the received message could include code (or pseudo-code) for specifying copying location(s) on the device.

Certain adaptations and modifications of the described embodiments can be made. Therefore, the above discussed embodiments are considered to be illustrative and not restrictive.

What is claimed is:

1. A method for providing files to a mobile communications device from a personal computer over one of a plurality of potential communication paths between the mobile communications device and the computer, comprising:
   receiving a request, through a user interface at the computer, that a selected file stored on the computer be provided to the mobile communications device;
   selecting a communications path from among the plurality of potential communication paths based on the size of the selected file and a characteristic of the communication path; and
   causing a copy of the selected file to be provided to the mobile communications device over the selected communication path.

2. The method of claim 1 in which the characteristic of the communication path is a pre-determined threshold, and in which selecting the communications path further comprises selecting the communications path when the size of the selected file is below the threshold.

3. The method of claim 2 in which there is a ranking of the plurality of potential communication paths and in which selecting the communications path further comprises selecting the highest ranked communication path of the plurality of potential communication paths for which the size of the selected file is below the threshold of the corresponding communications path.

4. The method of claim 2 in which selecting the communications path further comprises generating a request for confirmation of the selected communications path when the size of the selected file exceeds the threshold and in which causing the copy of the selected file to be provided to the mobile communications device further comprises causing the copy of the selected file to be provided when confirmation of the selected communications path is received.

5. The method of claim 2 in which selecting the communications path further comprises selecting a communication path that is currently unavailable and in which causing the copy of the selected file to be provided to the mobile communications device is delayed until the communication path is available.

6. A computer program product comprising a non-transitory computer-readable medium having encoded thereon computer-executable instructions, which when executed by a computer cause the computer to:
 receive a request, through a user interface at the computer, that a selected file stored on the computer be provided to the mobile communications device;
 select a communications path from among the plurality of potential communication paths based on the size of the selected file and a characteristic of the communication path; and
 cause a copy of the selected file to be provided to the mobile communications device over the selected communication path.

7. A system for providing files to a mobile communications device, comprising:
 a personal computer, including
  a plurality of interfaces for connecting to a plurality of potential communications paths from the personal computer to the mobile communications device,
  a display screen,
  a user input device, and
  a storage element storing a plurality of files; and
 a mobile file service module executable by the personal computer, wherein when the mobile file service module is executed by the personal computer the personal computer is configured to,
  detect a request, via the user input device, that a selected file stored on the computer be provided to the mobile communications device,
  select, upon detecting the file copy request, a communications path from among the plurality of potential communication paths based on the size of the selected file and a characteristic of the communication path, and
  cause a copy of the selected file to be provided to the mobile communications device over the selected communication path.

8. A method for transcoding files to be provided to a mobile communications device from a personal computer over one of a plurality of potential communication paths between the mobile communications device and the computer, comprising:
 receiving a request, through a user interface at the computer, that a selected file stored on the computer be provided to the mobile communications device;
 generating a transcoded copy of the selected file based on characteristics of the mobile communications device;
 selecting a communications path from among a plurality of potential communication paths; and
 causing the transcoded copy of the selected file to be provided to the mobile communications device over the selected communications path.

9. The method of claim 8 in which generating the transcoded copy of the selected file further comprises generating the transcoded copy of the selected file based on characteristics of the selected file.

10. The method of claim 8 in which the characteristics of the mobile communications device are known characteristics of the mobile communications device.

11. The method of claim 8 in which the characteristics of the mobile communications device are assumed characteristics of the mobile communications device.

12. The method of claim 8 in which generating the transcoded copy of the selected file further comprises generating the transcoded copy of the selected file based on characteristics of the selected communications path.

13. The method of claim 8 in which the selected file is at least one of an audio file, an image file and a video file.

14. The method of claim 13 in which generating a transcoded copy of the selected file comprises performing at least one of the following operations: resizing, lossy compression, high-pass filtering, low-pass filtering, color-space transformation, interlacing animation and removing unnecessary scripts or markup.

15. The method of claim 8 further comprising storing an untranscoded copy of the selected file on a server.

16. The method of claim 15 further comprising causing information from the untranscoded copy of the selected file to be provided to the mobile communications device from the server in response to a request for additional information.

17. A computer program product comprising a non-transitory computer-readable medium having encoded thereon computer-executable instructions which, when executed by a computer, configure the computer to:
 receive a request, through a user interface at the computer, that a selected file stored on the computer be provided to the mobile communications device;
 generate a transcoded copy of the selected file based on characteristics of the mobile communications device;
 select a communications path from among a plurality of potential communication paths; and
 cause the transcoded copy of the selected file to be provided to the mobile communications device over the selected communications path.

18. A system for providing files to a mobile communications device, comprising:
 a personal computer including:
  a plurality of interfaces for connecting to a plurality of potential communications paths from the personal computer to a predetermined mobile communications device;
  a display screen;
  a user input device; and
  a storage element storing a plurality of files; and
 a mobile file service module for:
  detecting a request, via the user input device, that a selected file stored on the computer be provided to the mobile communications device;

generating a transcoded copy of the selected file based on characteristics of the mobile communications device selecting a communications path from among a plurality of potential communication paths; and causing the transcoded copy of the selected file to be provided to the mobile communications device over the selected communications path.

* * * * *